(12) United States Patent
Vutukuri et al.

(10) Patent No.: US 8,878,870 B1
(45) Date of Patent: Nov. 4, 2014

(54) GRAPHIC PROCESSING TECHNIQUES AND CONFIGURATIONS

(75) Inventors: Satish Kumar Vutukuri, Sunnyvale, CA (US); Haohong Wang, San Jose, CA (US); Li Sha, San Jose, CA (US); Tao Xie, Fremont, CA (US); Ching-Han Tsai, San Jose, CA (US); Tzun-Wei Lee, Sunnyvale, CA (US); Leung Chung Lai, Union City, CA (US); Shuhua Xiang, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 1348 days.

(21) Appl. No.: 12/533,554

(22) Filed: Jul. 31, 2009

Related U.S. Application Data

(60) Provisional application No. 61/085,761, filed on Aug. 1, 2008, provisional application No. 61/085,756, filed on Aug. 1, 2008, provisional application No. 61/085,988, filed on Aug. 4, 2008.

(51) Int. Cl.
  *G09G 5/00* (2006.01)
  *G09G 5/377* (2006.01)
  *G06T 3/40* (2006.01)
  *G06T 15/00* (2011.01)
  *G06T 15/40* (2011.01)
  *G06T 15/50* (2011.01)

(52) U.S. Cl.
  CPC .............. *G09G 5/377* (2013.01); *G06T 3/4038* (2013.01); *G06T 2210/52* (2013.01); *G06T 15/005* (2013.01); *G06T 15/40* (2013.01); *G06T 15/503* (2013.01)

USPC ........... 345/629; 345/582; 345/505; 345/506; 345/555; 345/556; 345/419; 345/421; 345/422; 345/423; 345/424; 345/426; 345/427; 345/428; 345/630; 345/641

(58) Field of Classification Search
  CPC ....... G09G 5/377; G06T 3/4038; G06T 15/40; G06T 15/005; G06T 2210/52; G06T 15/503
  USPC .......... 345/629, 582, 505–506, 555, 419–428
  See application file for complete search history.

(56) References Cited

U.S. PATENT DOCUMENTS

| | | | | |
|---|---|---|---|---|
| 4,574,364 | A * | 3/1986 | Tabata et al. | 715/798 |
| 5,867,166 | A * | 2/1999 | Myhrvold et al. | 345/419 |
| 5,933,535 | A * | 8/1999 | Lee et al. | 382/243 |
| 6,515,673 | B1 * | 2/2003 | Hashimoto et al. | 345/582 |
| 7,027,072 | B1 * | 4/2006 | Sadowski | 345/629 |
| 7,034,837 | B2 * | 4/2006 | Sadowski et al. | 345/506 |
| 7,245,304 | B2 * | 7/2007 | Blais | 345/555 |
| 7,310,098 | B2 * | 12/2007 | Ohba | 345/428 |
| 7,358,974 | B2 * | 4/2008 | Blythe et al. | 345/505 |
| 7,505,050 | B2 * | 3/2009 | McCrossan et al. | 345/629 |

(Continued)

*Primary Examiner* — Jin-Cheng Wang

(57) ABSTRACT

Embodiments of the present invention provide graphic processing techniques and configurations including an apparatus comprising a storage medium having stored therein a table comprising information about respective positions and sizes of a number of rectangular blocks, the rectangular blocks to substantially form at least one plane having an arbitrary shape object, and at least one overlay engine operatively coupled with the table and associated with the at least one plane to request the information about the respective positions and the sizes of the number of rectangular blocks to provide graphics overlay of the arbitrary shape object. Other embodiments may be described and/or claimed.

20 Claims, 10 Drawing Sheets

(56) References Cited

U.S. PATENT DOCUMENTS

| | | | |
|---|---|---|---|
| 2006/0170693 A1* | 8/2006 | Bethune et al. | 345/568 |
| 2006/0214949 A1* | 9/2006 | Zhang | 345/629 |
| 2006/0268012 A1* | 11/2006 | MacInnis et al. | 345/629 |
| 2009/0185789 A1* | 7/2009 | Mccrossan et al. | 386/95 |

* cited by examiner

GRAPHIC PROCESSING TECHNIQUES AND CONFIGURATIONS

CROSS REFERENCE TO RELATED APPLICATIONS

The present application claims priority to U.S. Provisional Patent Application No. 61/085,761, filed Aug. 1, 2008, entitled "A Programmable Rectangular Block Overlay Scheme Supporting Arbitrary Shape Objects," U.S. Provisional Patent Application No. 61/085,756, filed Aug. 1, 2008, entitled "Bandwidth Efficient Data Loading Control Mechanism for Visual Post Processing," and U.S. Provisional Patent Application No. 61/085,988, filed Aug. 4, 2008, entitled "Z-Order Filtering with Embedded Messages," the entire specifications of which are hereby incorporated by reference in their entireties for all purposes, except for those sections, if any, that are inconsistent with this specification.

TECHNICAL FIELD

Embodiments of the present disclosure relate to the field of video/graphics, and more particularly, to techniques and configurations to improve video/graphics processing.

BACKGROUND

Generally, graphic overlay schemes allow overlay of multiple rectangular windows. Overlay schemes that support arbitrary shape objects are becoming increasingly necessary to support emerging shapes other than rectangles in, for example, graphics processing overlay such as video overlay.

Push-based deinterlacers may generally require a continuous feed of data from memory, which may place stringent quality of service (QoS) requirements on the memory controller and other related components. Sustaining a peak bandwidth requirement for such push-based deinterlacers may be increasingly difficult, where a line size may be about 1920 pixels or greater.

Further, typical push-based architectures work with two timing generators, one for the input and one for the output, to drive the display per the required output resolution/rate. These two timing generators are typically locked/synchronized so that video data is properly transferred across the video pipeline. Synchronization of the two timing generators may place significant demands on associated hardware and/or software.

Still further, a push-based deinterlacer may operate on the input clock rate for lack of back pressure to allow flow control. In such push-based deinterlacers, the input clock and the output clock may be adjusted to accommodate respective scaling ratios, which may require a complex timing scheme to tune the input and output clocks.

In typical graphic display applications, a plurality of images may be sent to the display engine and overlaid with each other for display. Portions of one image may block the display of another image. For example, a smaller subtitle image may block part of a video image. The portions of the video image behind the subtitle image may not be displayed or seen. Thus, the bandwidth for transferring the image data for the region of the video image that is hidden from view by the subtitle image may be wasted.

SUMMARY

In various embodiments, the present disclosure provides an apparatus comprising a storage medium having stored therein a table comprising information about respective positions and sizes of a number of rectangular blocks, the rectangular blocks to substantially form at least one plane having an arbitrary shape object, and at least one overlay engine operatively coupled with the table and associated with the at least one plane to request the information about the respective positions and the sizes of the number of rectangular blocks to provide graphics overlay of the arbitrary shape object.

In various embodiments, the present disclosure further provides an apparatus comprising a storage medium having stored thereon information associated with a graphic object, an interface coupled to the storage medium to transfer the information from the storage medium to a display buffer in response to a request to transfer the information, and a filtering module coupled to the interface, the filtering module configured to determine whether the requested information is for a hidden region and block the request to transfer the information if the information is determined to be for the hidden region.

In various embodiments, the present disclosure further provides a method comprising defining a number of rectangular blocks for at least one plane of a graphics overlay scheme, the at least one plane having an arbitrary shape object, wherein each of the rectangular blocks comprises a configurable position and a configurable size, and configuring the respective positions and sizes of the rectangular blocks in an overlay engine associated with the at least one plane to provide overlay of the arbitrary shape object.

In various embodiments, the present disclosure further provides a an apparatus comprising a storage medium having stored thereon information associated with one or more video frames, and a pull-based deinterlacer system coupled to the storage medium to request the information associated with the one or more video frames, wherein the pull-based deinterlacer system comprises a push-based deinterlacer.

In various embodiments, the present disclosure further provides a method comprising receiving a request to transfer information associated with a graphic object from a storage medium, determining, by a filtering module, whether the information associated with the graphic object is for a hidden region, and blocking the information from being transferred from the storage medium if the information is determined to be for the hidden region.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments of this disclosure are illustrated by way of example and not by way of limitation in the figures of the accompanying drawings.

DETAILED DESCRIPTION

Embodiments of the present disclosure describe graphic processing techniques and configurations. In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

The description may use perspective-based descriptions such as up/down, back/front, and top/bottom. Such descriptions are merely used to facilitate the discussion and are not intended to restrict the application of embodiments of the present invention.

For the purposes of the present invention, the phrase "A/B" means A or B. For the purposes of the present invention, the phrase "A and/or B" means "(A), (B), or (A and B)." For the purposes of the present invention, the phrase at least one of A, B, and C" means "(A), (B), (C), (A and B), (A and C), (B and C), or (A, B and C)."

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described herein may be performed in a different order than the described embodiment. Various additional operations may be performed and/or described operations may be omitted in additional embodiments.

Figure 1:
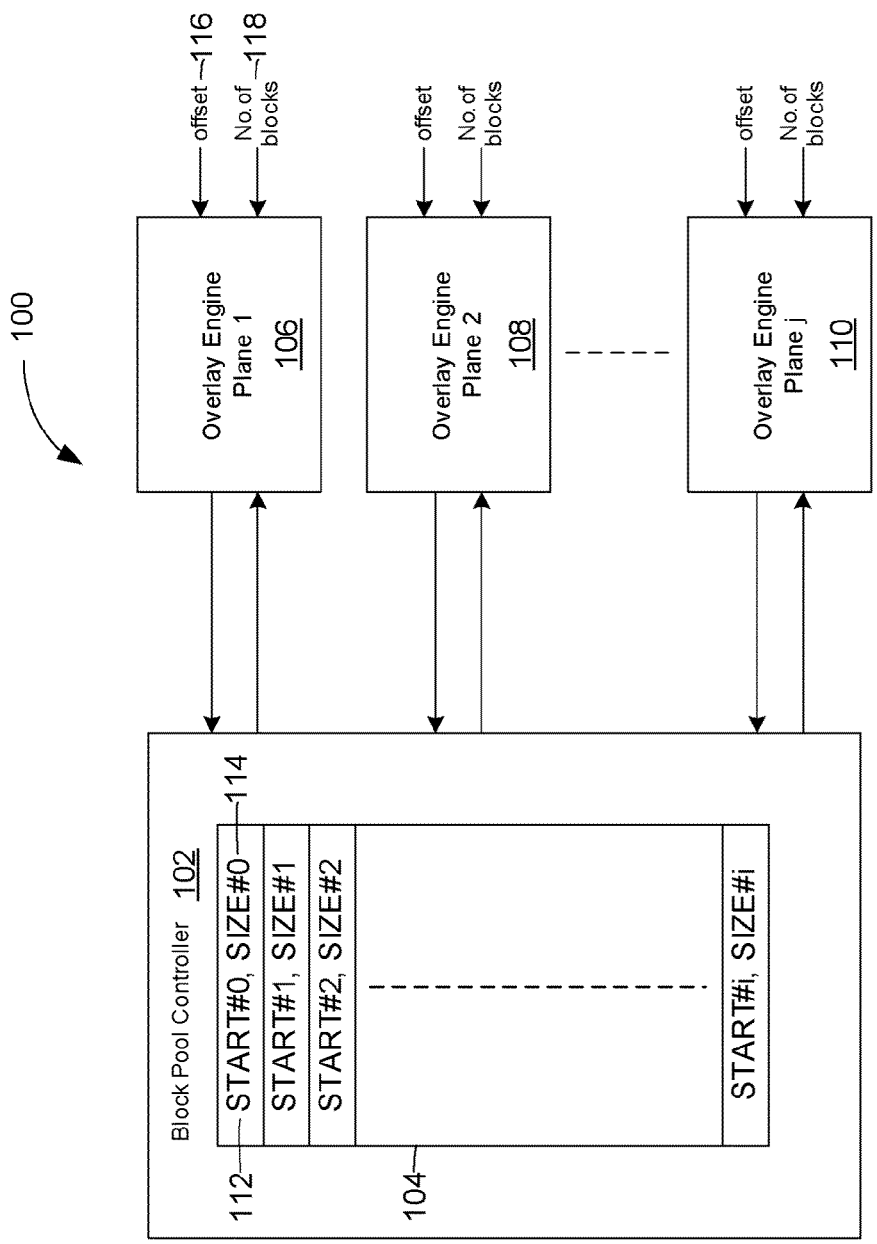
FIG. 1 schematically illustrates a rectangular block-based overlay scheme supporting arbitrary shape objects, in accordance with various embodiments.

FIG. 1 is a schematic diagram of a rectangular block-based overlay scheme 100 supporting arbitrary shape objects, in accordance with various embodiments. In an embodiment, overlay scheme 100 includes a controller 102 (e.g., block pool controller), a table 104 comprising information about at least position 112 and size 114 of a number of rectangular blocks, and one or more overlay engines 106, 108, 110 operatively coupled as shown.

One or more overlay engines 106, 108, 110, may be operatively coupled with controller 102 or table 104 to request information about position and size of a number of rectangular blocks to provide overlay of an arbitrary shape object. The one or more overlay engines 106, 108, 110 may be coupled with one or more respective planes for overlay. For example, overlay engine 106 may be associated with a first plane, Plane 1, overlay engine 108 may be associated with a second plane, Plane 2, and so forth. Overlay engine 110, may be associated with a jth plane, Plane j, where j is a positive integer representing any number of planes.

The respective planes associated with the overlay engines 106, 108, 110 may be any of a variety of planes. In an embodiment, the planes include at least one or more of a graphics plane, subpicture plane, subvideo plane, and main video plane. The planes may further include background planes and/or other types of picture-in-picture (PIP) video planes. Subject matter is not limited in this regard and overlay engines 106, 108, 110 may be associated with other types of planes for overlay in other embodiments.

The planes associated with overlay engines 106, 108, 110 may be for one or more arbitrary shape objects. The arbitrary shape objects associated with the planes may be the same shape or different shapes. For example, the arbitrary shape objects of the planes may include combinations of circular or rectangular objects. Subject matter is not limited in this regard and arbitrary shape objects may include a variety of other shapes and combinations of shapes, some of which are further described herein.

In an embodiment, one or more overlay engines 106, 108, 110 comprise rectangular-based overlay engines configured in an overlay scheme 100 to provide overlay of planes having arbitrary shape objects. Examples of arbitrary shape objects and an arbitrary shape object formed using rectangular blocks are further described with respect to FIGS. 2 and 3, respectively.

In an embodiment, the one or more overlay engines 106, 108, 110 are programmed or otherwise configured with an offset address 116 and a number of rectangular blocks 118. The one or more overlay engines 106, 108, 110 may be configured to provide the offset address 116 and number of rectangular blocks 118 to the controller 102 in a request for information about the position 112 and size 114 of the number of rectangular blocks. Offset address 116 may indicate the offset address in memory of the table 104 comprising the information about the position 112 and size 114 of the rectangular blocks. The number of rectangular blocks 118 may indicate how many rectangular blocks are to be allocated to a requesting overlay engine, such as overlay engine 106, starting from the offset address 116.

The number of rectangular blocks defined for a plane having an arbitrary shape object may be fixed or variable. In an embodiment, where the number of rectangular blocks is variable, the number of blocks 118 configured in overlay engine 106 may depend on the shape of the arbitrary shape object and the desired fineness or coarseness of the arbitrary shape formed using the number of the rectangular blocks. For example, a higher number of rectangular blocks 118 may correspond with a finer approximation of the arbitrary shape and a lower number of rectangular blocks 118 may correspond with a rougher approximation of the arbitrary shape. Different arbitrary shapes may use a different number of rectangular blocks 118 to approximate the arbitrary shape.

Overlay scheme 100 may include the controller 102 operatively coupled with the table 104 and at least one overlay engine 106 to maintain table 104 and provide or allocate information about position 112 and size 114 of a number rectangular blocks to one or more overlay engines 106, 108, 110. Controller 102 may be configured to receive requests for information about the position 112 and size 114 of the number of rectangular blocks 118 from the one or more overlay engines 106, 108, 110.

Controller 102 may be further configured to arbitrate among requests for information about the position and the size of the number of rectangular blocks 118 from multiple overlay engines 106, 108, 110, and provide the information about the position 112 and size 114 of the number of rectangular blocks 118 to the overlay engines 106, 108, 110. In an embodiment, the controller 102 is configured to allocate the information about the position 112 and size 114 of the number of rectangular blocks to the overlay engines 106, 108, 110 according to a First In, First Out (FIFO) scheme. Subject matter is not limited in this regard, and controller 102 may be configured to allocate the information according to other priorities or schemes.

Table 104 may be stored in a storage medium including, for example, memory such as random access memory (RAM). Example storage media of an electronic system 1115 that may implement an overlay scheme 100 are further described with respect to FIG. 11.

In an embodiment, table 104 includes information about a position 112 and size 114 of a number of rectangular blocks. For example, a first entry in table 104 may include position information 112 (START#0) and size information 114 (SIZE#0) for a first rectangular block and a second entry in table 104 may include position information START#1 and size information SIZE#1, for a second rectangular block, and so forth, until START#i and SIZE#i, where i represents a number of rectangular blocks. Subject matter is not limited in this regard and position 112 and size 114 information may be arranged in table 104 according to other formats or techniques in other embodiments.

In an embodiment, the table 104 includes information organized as a pool of block configuration registers to be allocated to multiple planes associated with respective multiple overlay engines 106, 108, and 110. In an embodiment, such allocation of block configuration registers having position 112 and size 114 information allows the multiple planes to support variable numbers of rectangular blocks 118. Such functionality may allow control of the fineness or coarseness of a plane having an arbitrary shape object.

The table 104 may provide the position 112 and size 114 information via a Cartesian coordinate system. For example, information about the position 112 may include a starting x coordinate and a starting y coordinate on a plane. Such coordinates may correspond with pixels on the plane. Information about the size 114 may include a number of pixels in the x direction from the starting x coordinate and a number of pixels in the y direction from the starting y coordinate, where the x and y directions are substantially perpendicular to one another. In an embodiment, the information about position 112 and size 114 are positive integers. In an embodiment, the number of pixels in the x direction and in the y direction includes 1 pixel by 1 pixel, respectively, to provide a high level of fineness or granularity in approximating the arbitrary shape object using the number of rectangular blocks 118. Subject matter is not limited in this regard and position 112 and size 114 information may be provided using other formats, including formats to support other dimensions such as, for example, three dimensions.

The information about position 112 and size 114 of the number of rectangular blocks 118 may be determined by executing instructions stored on a storage medium. The instructions may include, for example, any well-known technique or method to approximate an arbitrary shape using rectangular shapes or blocks. In an embodiment, the instructions are used to configure the one or more overlay engines 106, 108, 110 with the position 112 and size 114 information. In an embodiment, the information about the position 112 and size 114 of the number of rectangular blocks provides for a contiguous arrangement of the number of rectangular blocks in the shape of the arbitrary shape object.

Figure 11:
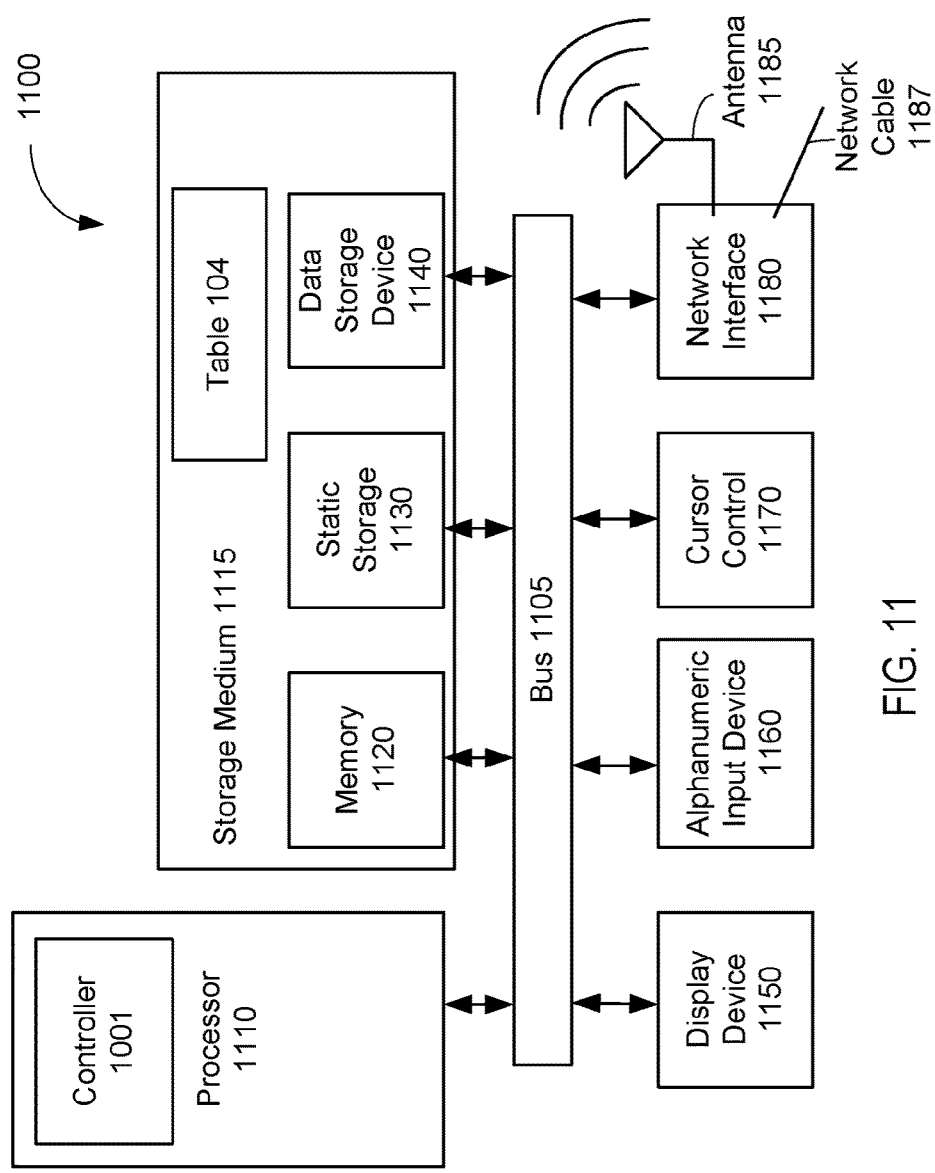
FIG. 11 is a schematic diagram of an example electronic system for implementing embodiments described herein.

Overlay scheme 100 may be operatively coupled with a display device 1150 as described further with respect to electronic system 1100 of FIG. 11. For example, a processor 1110 may be coupled with a storage medium 1115 having stored therein table 104. A display 1150 may be coupled with the processor 1110 to display at least one plane, e.g., Plane 1, associated with an overlay engine 106 having the arbitrary shape object in an overlay scheme. The arbitrary shape object may be approximately or substantially formed using the number of rectangular blocks 118.

Figure 2:
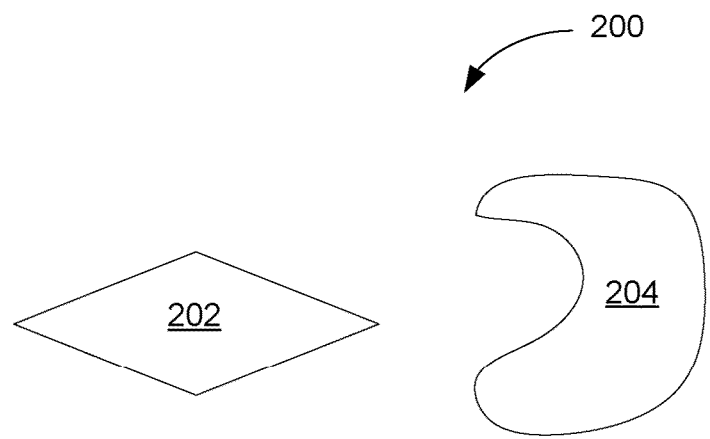
FIG. 2 schematically illustrates some example arbitrary shapes, in accordance with various embodiments.

FIG. 2 is an illustration of some example arbitrary shapes, in accordance with various embodiments. Planes or windows associated with video or other graphics overlay may have an arbitrary shape.

In an embodiment, an arbitrary shape object 200 includes a wide variety of polygons, including an example tetragon 202. The arbitrary shape object 200 is not limited to polygons and may further include any amorphous shape 204. For example, the arbitrary shape object 200 may include shapes having various combinations of curves and/or straight lines.

In an embodiment, the arbitrary shape object 200 is at least one of a circle, ellipse, oval, or other shape defined by curves. In another embodiment, the arbitrary shape object 200 may include a triangle, tetragon, pentagon, hexagon, heptagon, octagon, nonagon, decagon, and so forth, including polygons having a sufficiently high number of sides such that the sides are substantially indistinguishable from a curve. The arbitrary shape object 200 may include any non-rectangular shape.

Figure 3:
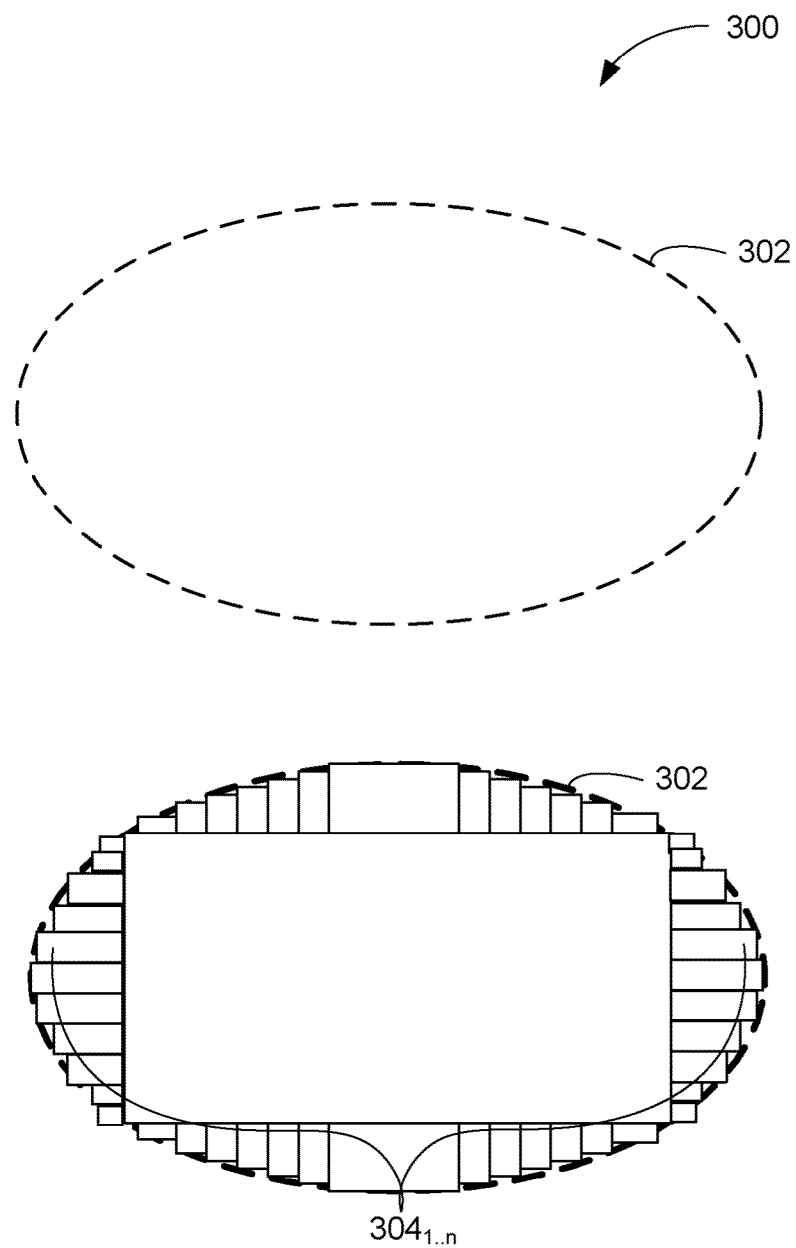
FIG. 3 schematically illustrates an example arbitrary shape object formed using a number of rectangular blocks, in accordance with various embodiments.

FIG. 3 is a schematic diagram of an example arbitrary shape object formed using a number of rectangular blocks $304_{1...n}$, in accordance with various embodiments. Although a circular arbitrary shape object 302 is depicted, arbitrary shape object 302 may be of various forms including those described with respect to FIG. 2.

One or more rectangular blocks $304_{1...n}$ may be used to form the arbitrary shape object 302, where n represents a variable number of rectangular blocks. In an embodiment, arbitrary shape object 302 is approximately or substantially formed using the number of rectangular blocks $304_{1...n}$. The number of rectangular blocks $304_{1...n}$ may be variable to provide a desired amount of fineness or coarseness of an approximation of the arbitrary shape object 302 using the rectangular blocks $304_{1...n}$. For example, a larger number of blocks may provide a higher level of fineness and a smaller number of blocks may provide a lower level of fineness.

Although a particular arrangement of rectangular blocks $304_{1...n}$ is depicted in FIG. 3, it will be appreciated by those having skill in the art that one or more rectangular blocks $304_{1...n}$ may be arranged in a variety of other ways to approximately or substantially form an arbitrary shape object 302. In an embodiment, the rectangular blocks $304_{1...n}$ are arranged in any of a variety of ways that provide a contiguous plane of the rectangular blocks $304_{1...n}$ in the shape of the arbitrary shape object 302.

Figure 4:
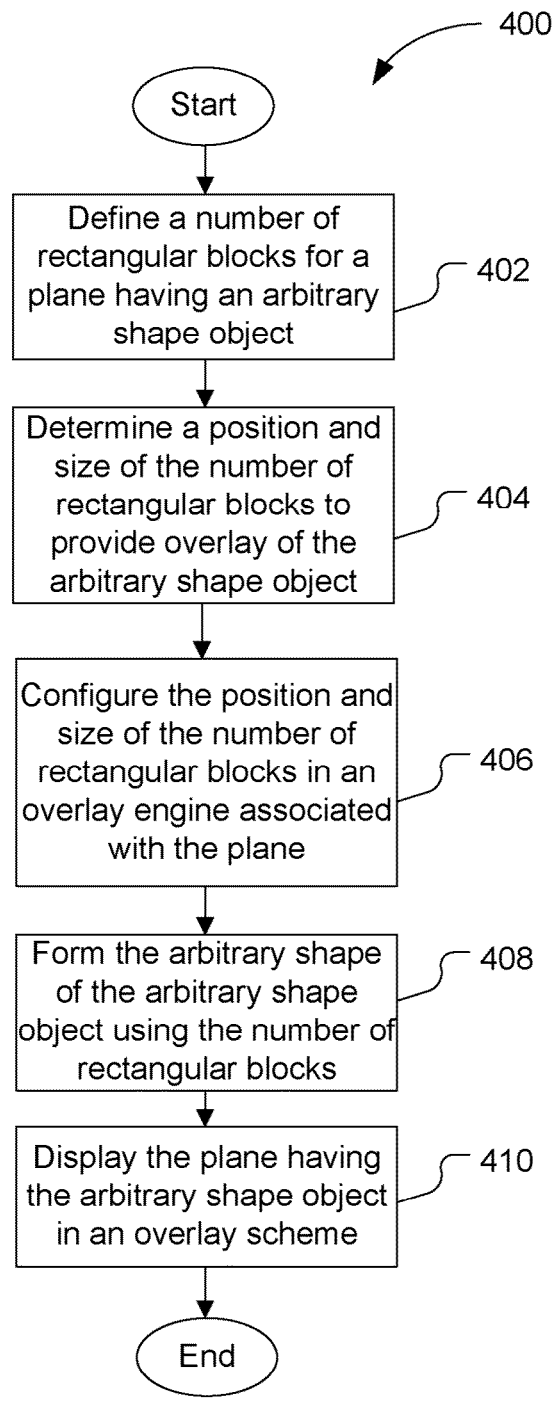
FIG. 4 is a process flow diagram of a method for rectangular block-based overlay supporting arbitrary shape objects, in accordance with various embodiments.

FIG. 4 is a process flow diagram of a method for rectangular block-based overlay supporting arbitrary shape objects, in accordance with various embodiments. In an embodiment, a method 400 includes defining a number of rectangular blocks for a plane having an arbitrary shape object, at block 402, determining a position and size of the number of rectangular blocks to provide overlay of the arbitrary shape object, at block 404, and configuring the position and the size of the number of rectangular blocks in an overlay engine associated with the plane, at block 406. The method 400 may further include forming the arbitrary shape of the arbitrary shape object using the number of rectangular blocks, at block 408, and displaying the plane having the arbitrary shape object in an overlay scheme, at block 410.

At block 402, method 400 includes defining a number of rectangular blocks for at least one plane having an arbitrary shape object, wherein the rectangular blocks comprise a configurable position and a configurable size. The number of blocks defined may be fixed or variable. In an embodiment, defining a number of rectangular blocks includes defining a variable number of rectangular blocks. The number of rectangular blocks defined may depend on at least the shape of the arbitrary shape object and the desired fineness or coarseness of the arbitrary shape object to be formed using the number of rectangular blocks. According to various embodiments, method 400 includes defining a number a number of rectangular blocks for multiple planes having respective arbitrary shapes.

Method 400 may further include determining the position and the size of the number of rectangular blocks at 404. In an embodiment, determining the position and the size of the number of rectangular blocks is accomplished by executing instructions by a processor, the instructions being stored on a computer readable medium, such as a storage medium, coupled to the processor. A variety of well-known techniques may be implemented to determine the position and the size of the rectangular blocks to form the arbitrary shape object. For example, determining the position and the size of the number of rectangular blocks may include arranging the number of rectangular blocks such that a plane associated with an overlay engine includes a contiguous arrangement of the rectangular blocks to approximately or substantially form the arbitrary shape object for overlay.

Method 400 may further include configuring the position and the size of the rectangular blocks in an overlay engine associated with the at least one plane at 406 to provide overlay of the arbitrary shape object. In an embodiment, method 400 includes configuring the position and the size of the rectangular blocks in multiple overlay engines associated respectively with multiple planes having respective arbitrary shape objects to provide overlay of the arbitrary shape objects. The size and the position of the rectangular blocks may be configured, for example, by using a Cartesian coordinate system. For example, configuring the position may include defining a starting x coordinate and a starting y coordinate. Further, configuring the size may include defining a number of pixels in the x direction from the starting x coordinate and a number of pixels in the y direction from the starting y coordinate, wherein the x and y direction are substantially perpendicular to one another. In one embodiment, defining the number pixels in the x direction and in the y direction includes defining 1 pixel by 1 pixel, respectively, for each direction to provide a high level of fineness or granularity in approximating the arbitrary shape object for overlay using the number of rectangular blocks. The position and the size of the rectangular blocks may be represented by positive integer values. Subject matter is not limited in this regard and may include other techniques to represent the position and the size of the rectangular blocks.

Configuring the position and the size of the rectangular blocks in an overlay engine may further include allocating information about the position and the size of the rectangular blocks to the overlay engine. Information about the position and the size may be allocated in response to a request for the information. Said configuring the position and the size of the rectangular blocks may further include requesting, via the overlay engine, information about the position and the size of the rectangular blocks using an offset address and the number of rectangular blocks. The offset address may indicate an offset address in memory of a table comprising the information about the position and the size of the rectangular blocks. The number of rectangular blocks may indicate how many rectangular blocks are allocated starting from the offset address for the requesting overlay engine. Subject matter is not limited in this regard and other techniques to configure the position and/or size of rectangular blocks in an overlay engine may be used in other embodiments.

Allocating information about the position and the size of the rectangular blocks may be performed by the controller 102. The controller 102 may be configured to receive requests from the overlay engine, maintain memory that stores a table comprising the information about the position and the size of the rectangular blocks, arbitrate among requests of the overlay engines, and provide the information about the position and the size of the rectangular blocks to the overlay engines. The controller 102 may dynamically allocate information according to a First In, First Out (FIFO) scheme. The controller 102 may perform more or fewer functions than described above. Subject matter is not limited in this regard and other functions or priority schemes may be implemented to allocate information about the position and the size of the rectangular blocks in other embodiments.

Method 400 may include approximately or substantially forming the arbitrary shape object or objects at 408 using the number of rectangular blocks. In an embodiment, method 400 further includes displaying at least one plane having the arbitrary shape object in an overlay scheme at 410. The at least one plane having the arbitrary shape may be approximately or substantially formed using the rectangular blocks. Displaying at least one plane having the arbitrary shape object may be performed in an application using, for example, a video or other graphics-related overlay. The at least one plane may be displayed according to any well-known technique.

Figure 5:
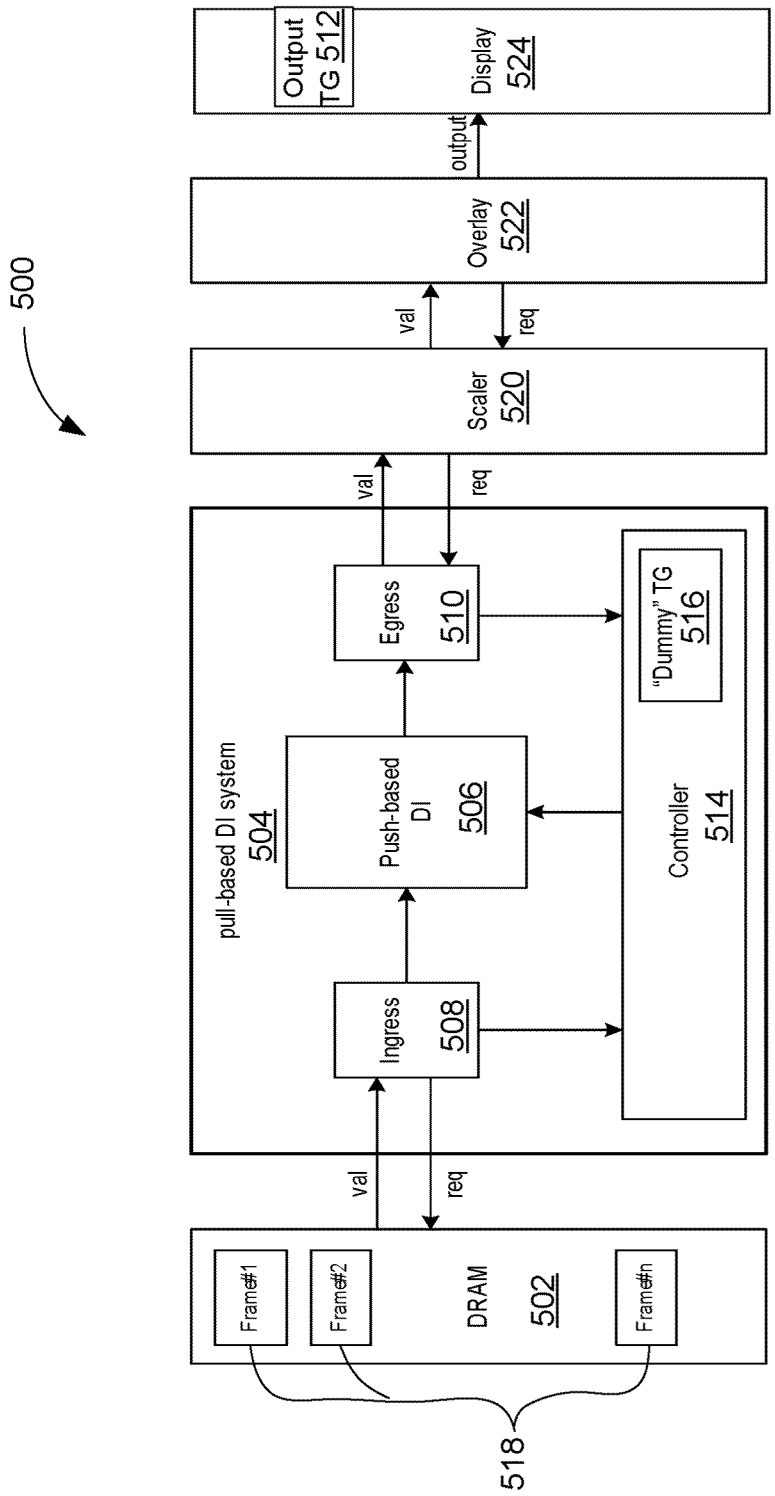
FIG. 5 schematically illustrates a data loading mechanism comprising a pull-based deinterlacer system using a push-based deinterlacer, in accordance with various embodiments.

FIG. 5 schematically illustrates a data loading mechanism 500 comprising a pull-based deinterlacer (DI) system 504 using a push-based deinterlacer 506, in accordance with various embodiments of the present invention. In an embodiment, the data loading mechanism 500 comprises a storage medium 502 (e.g., DRAM) having stored thereon information associated with one or more video frames 518, the pull-based deinterlacer system 504, the push-based deinterlacer 506, an ingress queue 508, an egress queue 510, an output timing generator (TG) 512, a controller 514, and a "dummy" timing generator 516, coupled as illustrated. The data loading mechanism 500 may further include a scaler 520, overlay engine 522, and display 524, coupled as illustrated.

The push-based deinterlacer 506 may be any of a variety of deinterlacer designs that follow push-based architecture. A push-based architecture may sustain a peak bandwidth from the video pipeline. That is, the push-based deinterlacer 506 may be continuously fed with data of the frames 518 from the storage medium 502. The push-based deinterlacer 506 may operate on video timing reference signals such as, for example horizontal sync (HS), horizontal data enable (HDE), vertical sync (VS), vertical design enable (VDE), and/or field (FLD) signals. The present subject matter is not limited in this regard and may include other video timing reference signals in other embodiments.

The pull-based deinterlacer system 504 may include components such as the output timing generator 512, the ingress queue 508, the egress queue 510, the controller 514, and the "dummy" timing generator 516 to provide pull-based behavior and provide a variety of benefits. For example, the data loading mechanism 500 may efficiently even-out the peak bandwidth requirement from the push-based deinterlacer 506 and allow processing of data from multiple clients. The data may be provided, for example, in the storage medium 502. The storage medium 502 may include on-chip or off-chip memory such as dynamic random access memory (DRAM) or other suitable memory device. The pull-based deinterlacer system 504 may further reduce quality of service (QoS) requirements on a memory controller, which may be coupled to control memory of the storage medium 502, and other related components compared to the push-based deinterlacer 506 alone.

Further, the pull-based deinterlacer system 504 allows operation with a single timing generator (e.g., the output TG 512) as opposed to typical push-based architectures that work with two timing generators or clocks, one for the input and one for the output, to drive the display per the output resolution/rate. Thus, there is no need to synchronize input and output timing generators in the data loading mechanism 500, thereby reducing demands on associated hardware and/or software used for deinterlacing the frames 518 and/or the complexity of timing schemes that may be used to tune the input and output timing generators.

The pull-based deinterlacer system 504 may operate on a single clock such as, e.g., a system-on-a-chip (SoC) clock, the output TG 512, or some other clock because back pressure or flow control is provided in the pull-based deinterlacer system 504, meaning that the system 504 can stop requesting data of frames 518 from the storage medium 502 and preserve the state of the push-based deinterlacer 506 by controlling the clock with the controller 514. Although the output TG 512 is depicted within the display block 524, it may be associated with other modules in other embodiments.

The pull-based deinterlacer system 504 is coupled to the storage medium 502 to request (req) information such as a value (val) associated with the one or more video frames 518. The ingress queue 508 is coupled to an input of the deinterlacer 506, as illustrated, to request the information and to input the information to the deinterlacer 506. The egress queue 510 is coupled to an output of the deinterlacer 506 to receive and output the information from the deinterlacer 506. The ingress queue 508 and the egress queue 510 may each include a FIFO queue or any other suitable type of queue.

The controller 514 is coupled to the deinterlacer 506, the ingress queue 508, and the egress queue 510 to mimic push-based behavior at the input of the deinterlacer 506. The controller 514 may be a smart controller in that it mimics push-based behavior, for example, by enabling the dummy timing generator 516 to the deinterlacer 506 when the ingress queue 508 has a threshold amount of information therein and the egress queue 510 has a threshold amount of space for the information. The threshold amounts may be controlled, for example, by the controller 514 or other logic.

The "dummy" timing generator 516 is coupled to the controller 514 to generate video timing reference signals that mimic the push-based behavior at the input of the deinterlacer 506. For example, the "dummy" timing generator 516 may provide horizontal sync (HS), horizontal data enable (HDE), vertical sync (VS), vertical data enable (VDE), and/or field (FLD) signals. The controller 514 may receive control signals from the "dummy" timing generator 516 and enable the output timing generator 512 accordingly to run the deinterlacer 506. In an embodiment, the "dummy" timing generator 516 does not need to be locked to the output timing generator 512.

To account for possible finite delay in the deinterlacer 506, the controller 514 may be further configured to detect when a frame 518 is done or nearly done and enable the output timing generator 512 to the deinterlacer 506 even when there is no information in the ingress queue 508. The controller 514 may, for example, run the deinterlacer 506 at the boundary of the frames 518 according to the amount of space in the egress queue 510. Such functionality may allow the pull-based deinterlacer system 504 to keep the deinterlacer 506 running at the boundary of the frames 518 to account for some amount of finite pipeline latency in the deinterlacer 506.

The data loading mechanism 500 may further include a scaler 520 coupled to the egress queue 510 to receive the information processed by the push-based deinterlacer 506. The scaler 520 may, for example, convert video signals from one resolution to another or perform any other well-known function associated with a video scaler. An overlay engine or module 522 may be coupled to the scaler 520 to receive the information processed by the scaler 520 for overlay processing. The overlay engine 522 may output the information to the display 524 to display the processed video frames 518.

According to various embodiments, FIG. 5 may describe integration of a push-based deinterlacer 506 in a flow-control based system-on-a-chip (SoC). The push-based deinterlacer 506 may translate an interlaced image (e.g., frames 518) to a progressive image. Multiple planes may exist and each plane may be equipped with a respective push-based deinterlacer 506.

Figure 6:
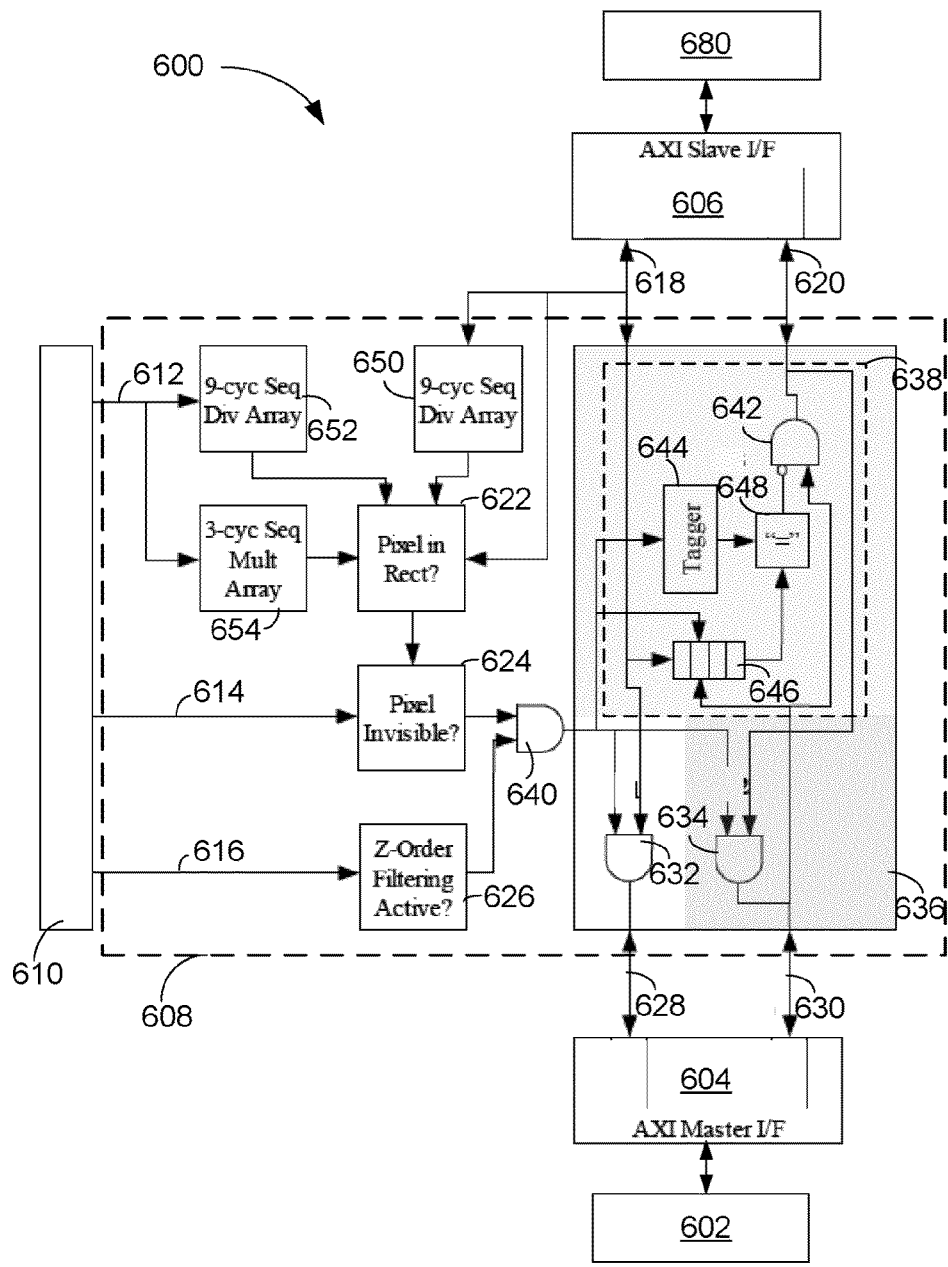
FIG. 6 schematically illustrates a configuration for a filtering module, in accordance with various embodiments.

FIG. 6 schematically illustrates a configuration 600 for a filtering module 608 in accordance with various embodiments. The filtering module 608 may reduce image data that is transferred from memory for a hidden region of overlapping graphic objects, such as planes. For example, overlapping planes may include interlaced images which are processed by the push-based deinterlacer 506 of FIG. 5.

The configuration 600 includes a storage medium 602 having stored thereon information associated with a graphic object. The storage medium 602 may include, for example, memory such as random access memory (RAM) or other suitable memory for graphics processing. The information associated with the graphic object may include, for example, pixel data for a video frame, but is not limited in this regard. An interface 604 on a reader side of the filtering module 608 is coupled to the storage medium 602 to transfer the information from the storage medium 602 to a display buffer 680 in response to a request to transfer the information. The request to transfer the information may be made, for example, through an interface 606 on a sender side of the filtering module 608.

The filtering module 608 is coupled to the interface 604 on the reader side and the interface 606 on the sender side. In an embodiment, the filtering module 608 is configured to determine whether the requested information is for a hidden region of the graphic object and to block the request to transfer the information if the information is determined to be for the hidden region. For example, the requested information may be data associated with a particular pixel. If the pixel is positioned within an area defined to be a hidden region, then the request to transfer the data may be blocked by the filtering module 608. In an embodiment, the filtering module 608 is configured to determine whether the requested information is within the hidden region by comparing parameters (e.g., position coordinates) that define a position for the information associated with the graphic object with parameters that define a position for the hidden region.

The filtering module 608 may be coupled with a register 610, which may include any suitable storage medium to store parameters associated with determining whether to block the requested information. For example, the parameters may include parameters that define the hidden region of the graphic object and/or parameters that define a region for a transaction. The transaction, for example, may include a request for information associated with a group of pixels (e.g., 128 byte transaction) of the graphic object having a defined region within the graphic object. Example types of parameters are described further with respect to FIG. 7.

Figure 7:
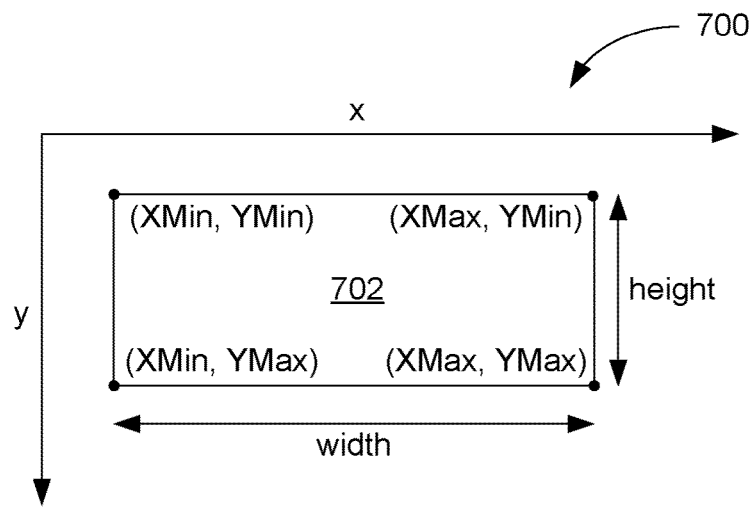
FIG. 7 schematically illustrates a hidden region, in accordance with various embodiments.

FIG. 7 schematically illustrates a hidden region 702, in accordance with various embodiments. In an embodiment, the parameters stored in the register 610 of FIG. 6 define a rectangular hidden region 702 having a base address, height, width, and stride. The hidden region 702 may be defined using a Cartesian coordinate system with X and Y directions, as illustrated. The base address (e.g., BaseAddr) may correspond with a starting point (e.g., XMin, YMin) to define the hidden region 702. The height may define a height of the hidden region 702 in the Y direction (e.g., YMax−YMin). The width may define a width of the hidden region 702 in the X direction (e.g., XMax−Xmin). The stride may be a distance, which may be measured in bytes, between a pixel and another pixel directly adjacent to the pixel in the Y direction.

Other parameters or definitions for the address, height, width, and/or stride may be used in other embodiments. According to various embodiments, the rectangle coordinates (XMin, XMax, YMin, and YMax) are defined according to the following:

$$X\text{Min}=\text{baseAddr \% stride} \quad (1)$$

$$X\text{Max}=(\text{baseAddr \% stride})+\text{width} \quad (2)$$

$$Y\text{Min}=\text{baseAddr} \quad (3)$$

$$Y\text{Max}=\text{baseAddr}+(\text{stride}*\text{width}) \quad (4)$$

Coordinates (X, Y) for pixels associated with requested pixel data for a transaction may be determined according to the following, where transAddr is a transaction address for the requested pixel data:

$$X=\text{transAddr \% stride} \quad (5)$$

$$Y=\text{transAddr} \quad (6)$$

Returning again to FIG. 6, the filtering module 608 may access the register 610 to determine whether requested pixel data is within the hidden region (e.g., 702). In an embodiment, the parameter(s) that define the hidden region are embedded in a header of a message sent to the filtering module 608. The message may be, for example, a message sent to request the pixel data at the interface 606 on the sender side. The filtering module 608 may receive updated parameters via the header of the message and update the respective parameters stored in the register 610 accordingly. In this regard, the hidden region can be modified during processing without significantly interrupting software that may be operating (e.g., instructions to perform graphics processing actions that are executed by a processor).

The filtering module 608 may be further configured to send any information other than the requested information without accessing the storage medium 602 if the information is determined to be for the hidden region. For example, the filtering module 608 may send tied zeros in response to a request for information that is within the hidden region.

According to various embodiments, the parameters may include geometrical parameters that define the hidden region (e.g., base, height, width, and stride). Four sets of such parameters may be fed, at 612, through 3-cycle sequential multipliers 654 to determine, for example, MinY and MaxY coordinates and through 9-cycle sequential dividers 652 to determine, for example, similar parameters associated with the X direction such as MinX and MaxX. The geometrical parameters may be used for comparison against the pixel locations of incoming requests for information, which may go through 9-cycle sequential dividers 650 to ascertain the parameters for the current transaction.

The geometrical parameters for the hidden region and for the requested pixel data may be compared at 622 to determine whether the pixel(s) is in a rectangle defined to be the hidden region. In an embodiment, the requested pixel information is determined to be within the hidden region if X≥XMin and X<XMax and Y≥YMin and Y<YMax. Other relationships may be used to determine whether the requested pixel information is within the hidden region in other embodiments.

Other parameters may be stored in the register 610. Control parameters may be used, at 614, to indicate whether the hidden region is active. If the active signal is set to "active" to indicate an active hidden region, for example, then a visibility signal may be checked at 624 to determine if a pixel that falls within the hidden region is visible. If a pixel falls within two or more rectangles that each define a hidden region, for example, a priority value may be used to indicate which of the rectangles will be visible. For example, different hidden regions may be prioritized using values from 0 to 3, where 3 may indicate a highest priority for visibility. The visibility may be checked at 624, for example, from priority 3 down to 0. Once a pixel is found to be inside an active hidden region, a visibility parameter/visible signal of that active priority level may be used.

A global active signal at 616 may be used to indicate whether the filtering module 608 is active or not at 626. If the global active signal at 616 is set to "inactive", then the transaction to request information associated with image data is directly bypassed to the interface 604, which may be an output master interface. If active, a similar result may occur for a case where all hidden regions are inactive. Such signal may allow pre-programming of hidden region parameters prior to making them active. An AND gate 640 may couple the parameters/signals that are evaluated at 624 and 626 with a traffic controller 636.

The traffic controller 636 is configured to block the requested pixel data if the requested pixel data is determined to be within the hidden region at 622 and invisible at 624. At a sender side, the traffic controller 636 is coupled to an interface 606 that receives and passes requests to transfer image data through the filtering module 608 to another interface 604 that is configured to transfer the requested information from the storage medium 602 where the image data is stored.

Interface 606 may be a slave interface and interface 604 may be a master interface. The interface 606 may comprise a bus that comports with any suitable protocol and may include, for example, an Advanced eXtensible Interface (AXI) that is in compliance with an Advanced Microcontroller Bus Architecture (AMBA) specification such as the AMBA specification 3.0 and variants thereof. Other types of interfaces and/or protocols may be used in other embodiments.

The interface 606 may include a buffered slave command interface 618 to feed an address of the transaction (e.g., geometrical parameters for requested pixel data) through dividers at 650 to determine the X/Y coordinate for comparison against the hidden region at 622. The interface 606 may further include a buffered slave data interface 620. For a write channel, incoming data for the transaction is thrown away if the pixel is invisible at 624. If the pixel is visible at 624, the incoming data is forwarded to the master data interface 630.

For a read channel, outgoing data for the transaction will comprise meaningless data (e.g., tied zeros) if the pixel is invisible at 624. However, if the pixel is visible at 624, data will be transferred from the master data interface 630.

The interface 604 may include a buffered master command interface 628. The buffered master command interface 628 may replicate the same command transaction from the interface 606, which may be a slave interface, if requested pixel data is determined to be visible at 624. The transaction is blocked if the requested pixel data is determined to be invisible at 624.

The interface 604 may further include a buffered master data interface 630. For a write channel, no data is sent out of the interface 604 if the pixel is invisible, else the data is taken from the slave data interface 620. For a read channel, no data is received from the interface 604 if the pixel is invisible, else incoming data (e.g., transferred from the storage medium 602) is forwarded to the slave data interface 620.

The traffic controller 636 includes a command interface blocker 632 that blocks outgoing command transactions to the storage medium 602 if filtering is active at 626 and the pixel is invisible at 624. The traffic controller 636 may further include a data interface blocker 634 that blocks outgoing data transactions to the storage medium 602 if filtering is active at 626 and the pixel is invisible at 624. The command interface blocker 632 and the data interface blocker 634 may each comprise an AND gate.

The traffic controller 636 may further include a tagging module 638. The tagging module 638 may include functionality that provides a data interface zero-padder. To accommodate transactions that need to be in-order with outstanding transaction capability, all blocked (e.g., invisible at 624) read transactions may be assigned a tag. The tag may be used to keep track of each outstanding transaction that has been sent out to the storage medium 602 to maintain the order of the returned data.

The tag may be assigned to blocked (e.g., invisible at 624) read transactions. For tracking purposes, all transactions processed by the traffic controller 636 may be tagged at a tagger 644 and pushed into a queue 646, such as a FIFO queue. When the outstanding read transaction completes its data channel transmission from the storage medium 602, the tag is pushed from the queue 646. When the current tag in the queue 646 matches the blocked tag from the tagging module 638 at 648, the traffic controller 636 generates its own data channel transaction and may pad the generated data with zeros. AND gate 642 may be coupled as illustrated to provide such logical function.

Figure 8:
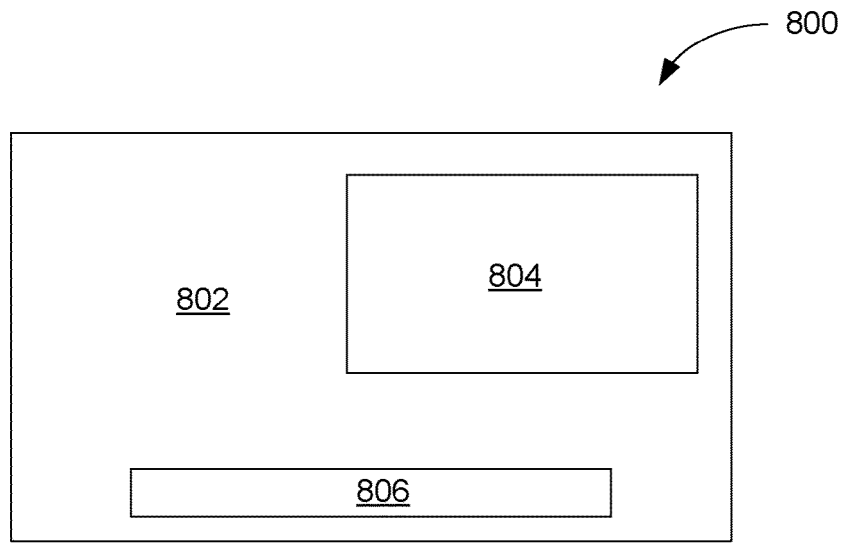
FIG. 8 schematically illustrates an example application of a hidden region, in accordance with various embodiments.

FIG. 8 schematically illustrates an example application of a hidden region, in accordance with various embodiments. A graphical object 800 may include a first image 802, a second image 804, and a third image 806.

In various embodiments, the second image 804 and the third image 806 are configured to be visible on a display. Portions of the first image 802 that underlie the regions covered by the second image 804 and the third image 806 may each correspond with a hidden region (e.g., 702) as they are not configured to be visible on a display. The second 804 image and/or the third image 806 may include, for example, a picture-in-picture (PIP) object or a subtitle object.

The filtering module 608 of FIG. 6 may determine, for example, whether image information associated with the first image 802 is within the hidden regions covered by the second image 804 and the third image 806 and block the transfer request for the information if the information is within one or more of the hidden regions. Thus, the filtering module 608 may be configured to adjust bandwidth associated with accessing and transferring information from the storage medium (e.g., 602) by reducing access to the storage medium for the information that is within one or more of the hidden regions.

Figure 9:
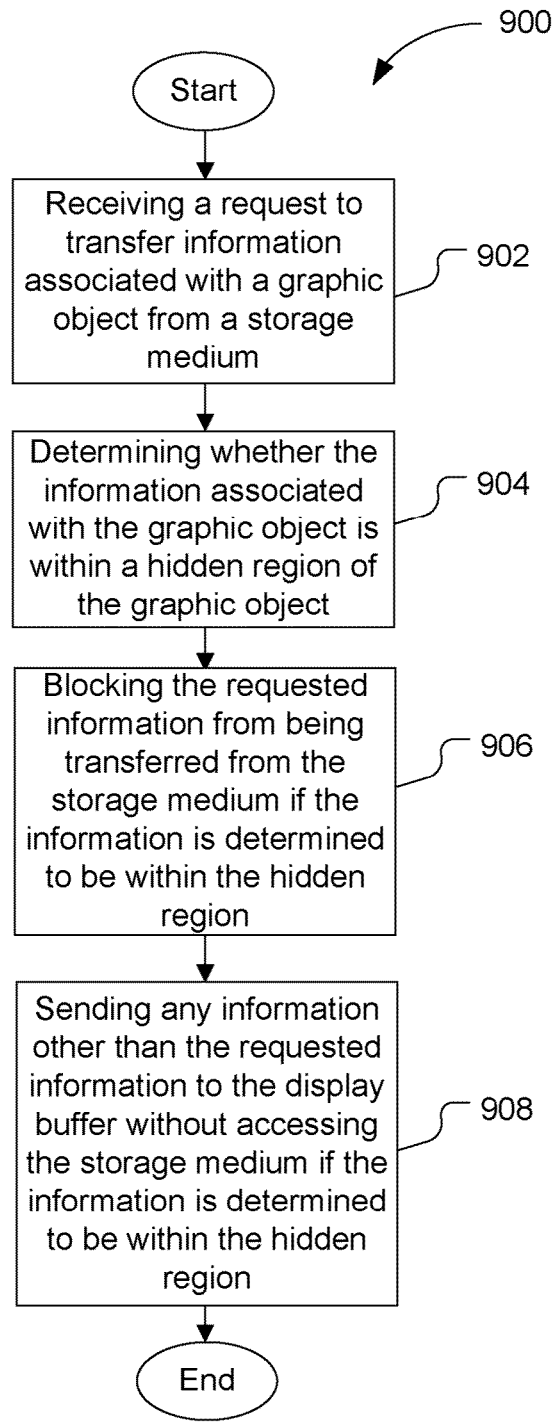
FIG. 9 is a process flow diagram of a method for filtering requests to transfer image data, in accordance with various embodiments.

FIG. 9 is a process flow diagram of a method 900 for filtering requests to transfer image data, in accordance with various embodiments. At block 902, method 900 includes receiving a request to transfer information associated with a graphic object from a storage medium. The transfer request may, for example, be in the form of an AXI transaction from the interface 606.

At 904, the method 900 further includes determining whether the information associated with the graphic object is within a hidden region. In an embodiment, the determining is performed by comparing position coordinates for the information associated with the graphic object (e.g., pixel data) with position coordinates for the hidden region to determine whether the information associated with the graphic object is positioned within the hidden region.

The determining may further include accessing one or more parameters stored in a register to compare the one or more parameters that define the hidden region with one or more parameters that define a location of the requested information to determine whether the information associated with the graphic object is positioned within the hidden region. Other similar or suitable techniques may be used to determine whether the requested information is within the hidden region.

At 906, the method 900 further includes blocking the requested information from being transferred from the storage medium if the information is determined to be within the hidden region. The blocking may prevent the information associated with the graphic object from being transferred from the storage medium to a display buffer. The blocking may prevent information associated with the graphic object from being transferred from a master interface to a slave interface.

At 908, the method 900 further includes sending information other than the requested information without accessing the storage medium, if the requested information is determined to be within the hidden region. The information sent may be any contrived, random, pseudo-random, or meaningless data, such as data padded with zeros. The meaningless data may be generated by any suitable technique. In an embodiment, the traffic controller 636 of the filtering module 608 generates the information to be sent.

Figure 10:
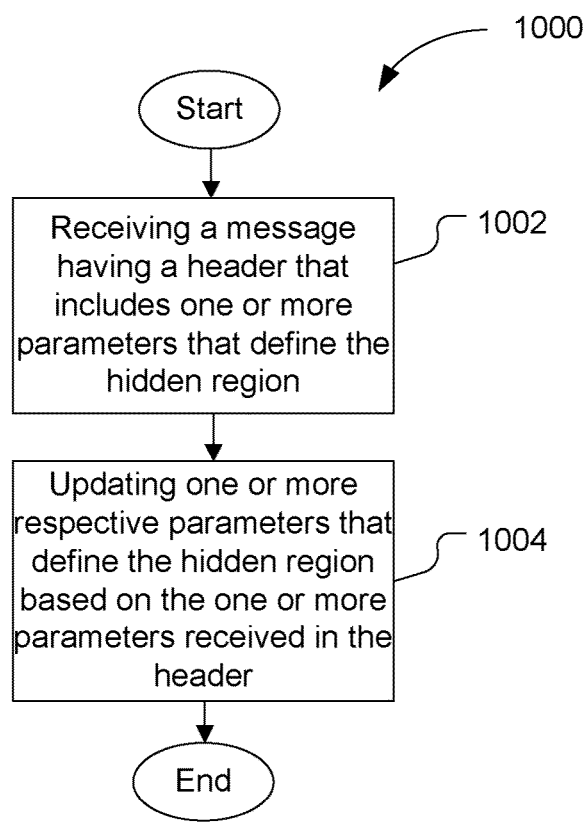
FIG. 10 is a process flow diagram of a method for updating parameters that define a hidden region of an image, in accordance with various embodiments.

FIG. 10 is a process flow diagram of a method 1000 for updating parameters that define a hidden region of an image, in accordance with various embodiments. At block 1002, method 1000 includes receiving a message having a header that includes one or more parameters that define the hidden region. The message may be a data message received, for example, at the slave data interface 620. The header may include updated parameters to update one or more respective parameters stored, for example, in the register 610. The parameters may include, for example, geometrical or control parameters.

At block 1004, the method 1000 further includes updating one or more respective parameters that define the hidden region based on the one or more parameters received in the header. The filtering module 608 may update the parameters stored in the register based on the parameters received in the header. Updating may be performed during graphics processing without significantly interrupting the processing.

FIG. 11 is a schematic diagram of an electronic system 1100 for implementing embodiments described herein. Electronic system 1100 may accord with embodiments already described herein. In an embodiment, electronic system 1100 is intended to represent a range of electronic devices (either wired or wireless). In an embodiment, electronic system 1100 represents a variety of devices including, for example, desktop computer devices, laptop computer devices, personal computers (PC), servers, printers, telephones, personal digital assistants (PDA) including cellular-enabled PDAs, set top boxes, pocket PCs, tablet PCs, DVD players, video players, but is not limited to these examples and may include other electronic devices. Alternative electronic systems may include more, fewer and/or different components.

Electronic system 1100 may include bus 1105 or other communication device or interface to communicate information, and processor 1110 coupled to bus 1105 that may process information. Bus 1105 may be a single system bus or a number of buses of the same or different types bridged together. System 1100 may include one or more processors and/or co-processors.

As used herein, the terms "module", "engine" or "controller" may refer to, be part of, or include an Application Specific Integrated Circuit (ASIC), an electronic circuit, a processor 1110 (shared, dedicated, or group) and/or memory 1120 (shared, dedicated, or group) that execute one or more software or firmware programs, a combinational logic circuit, and/or other suitable components that provide the described functionality.

In an embodiment, system 1100 includes a block 1101 that represents any of a variety of controllers, modules, or engines described herein including for example, the smart controller 514, the traffic controller 636, the filtering module 608, the tagging module 638, or the overlay engine 106. According to various embodiments, the block 1101 may be a software-based engine having functionality as described herein with respect to various controllers, modules, and/or engines. Processor 1110 may include any of a variety of components or functionality to generate, process, and/or output images to display device 1150 including, for example, video or other graphics processors or controllers.

System 1100 may also include a storage medium 1115, which may include various types of storage, coupled to bus 1105 to store information and/or instructions that may be processed and/or executed by processor 1110. Storage medium 1115 may include more or less types of storage than depicted according to various embodiments. In an embodiment, storage medium 1115 includes a table 104 in accordance with embodiments described herein. Table 104 may be stored, for example, in memory 1120, static storage 1130, or a data storage device 1140. Subject matter is not limited in this regard and table 104 may be stored in other types of storage medium 1115 in other embodiments. Storage medium 1115 may comprise a storage medium as described herein, such as, e.g., storage medium 502 or storage medium 602.

In an embodiment, electronic system 1100 includes an article of manufacture having a storage medium 1115 and a plurality of instructions stored in the storage medium 1115, that if executed, cause a machine to perform actions as described herein. The instructions may be in the form of firmware or software according to various embodiments and may be stored in memory 1120, static storage 1130, a data storage device 1140, or combinations thereof. The instructions may further be stored on other suitable types of storage.

In an embodiment, system 1100 includes random access memory (RAM) or other storage device 1120 (may be referred to as "memory"), coupled to bus 1105. Memory 1120 may also be used to store temporary variables or other intermediate information during execution of instructions by processor 1110. Memory 1120 is a flash memory device in one embodiment.

System 1100 may also include read only memory (ROM) and/or other static storage device 1130 coupled to bus 1105 that may store static information and instructions for processor 1110. Data storage device 1140 may be coupled to bus 1105 to store information and instructions. Data storage device 1140 such as a magnetic disk or optical disc and corresponding drive may be coupled with electronic system 1100.

Electronic system 1100 may also be coupled via bus 1105 to display device 1150, such as a cathode ray tube (CRT) or liquid crystal display (LCD), to display information to a user. In an embodiment, a display 1150 (e.g., display 524) is coupled with the processor 1110 to display one or more graphic objects or images as described herein. Display 1150 may further represent one or more displays described herein.

Alphanumeric input device 1160, including alphanumeric and other keys, may be coupled to bus 1105 to communicate information and command selections to processor 1110. Cursor control 1170 may be another type of input device and may include, for example, a mouse, a trackball, or cursor direction keys to communicate information and command selections to processor 1110 and to control cursor movement on display 1150.

Electronic system 1100 may further include one or more network interfaces 1180 to provide access to network 1120, such as a local area network, but is not limited in this regard. Network interface 1180 may include, for example, a wireless network interface having antenna 1185, which may represent one or more antennae. Network interface 1180 may also include, for example, a wired network interface to communicate with remote devices via network cable 1187, which may be, for example, an Ethernet cable, a coaxial cable, a fiber optic cable, a serial cable, or a parallel cable.

In one embodiment, network interface 1180 may provide access to a local area network, for example, by conforming to an Institute of Electrical and Electronics Engineers (IEEE) standard such as IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Previous or subsequent versions of the Bluetooth standard may also be supported.

Although certain embodiments have been illustrated and described herein, a wide variety of alternate and/or equivalent embodiments or implementations calculated to achieve the same purposes may be substituted for the embodiments illustrated and described without departing from the scope of the present invention. This application is intended to cover any adaptations or variations of the embodiments discussed herein. Therefore, it is manifestly intended that embodiments in accordance with the present invention be limited only by the claims and the equivalents thereof.

What is claimed is:

1. An apparatus comprising:
   a first storage medium configured to store a table comprising information about respective positions and sizes of a plurality of rectangular blocks, wherein the plurality of rectangular blocks substantially forms an arbitrary shape object of a first plane;
   at least one overlay engine operatively coupled with the table, wherein the at least one overlay engine is associated with the first plane, and wherein the at least one overlay engine requests the information about the respective positions and the sizes of the plurality of rectangular blocks to provide graphics overlay of the arbitrary shape object, wherein the plurality of rectangular blocks forming the arbitrary shape object of the first plane define hidden regions in a second plane that underlies the first plane, wherein the second plane includes (i) the hidden regions and (ii) non-hidden regions that are not to be hidden by the arbitrary shape object of the first plane while the second plane is being displayed;
   a second storage medium configured to store data associated with pixels of the second plane;
   a filtering module coupled to the second storage medium, wherein the filtering module is configured to
      receive a request to transfer, to a display buffer, data associated with pixels of a first region of the second plane from the second storage medium,
      determine whether the first region of the second plane is (i) within the hidden regions or (ii) within the non-hidden regions,
      in response to determining that the first region of the second plane is within the hidden regions, refrain from accessing the second storage medium to retrieve data associated with pixels of the first region of the second plane, and
      in response to (i) receiving the request to transfer data associated with pixels of the first region of the second plane from the second storage medium and (ii) determining that the first region of the second plane is within the hidden regions,
         generate data corresponding to the first region of the second plane, wherein the filtering module does not access the second storage medium to generate the data, and wherein the generated data corresponding to the first region of the second plane is different from data that are (i) stored in the second storage medium and (ii) associated with pixels of the first region of the second plane, and
         transfer the generated data to the display buffer; and
   a display configured to display
      (i) the first plane having the arbitrary shape object formed from the plurality of rectangular blocks, and
      (ii) the second plane excluding the hidden regions, wherein the first plane graphically overlays the second plane.

2. The apparatus of claim 1, wherein:
   the information about the respective positions comprises a starting x coordinate and a starting y coordinate; and
   the information about the respective sizes comprises a number of pixels in an x direction from the starting x coordinate and a number of pixels in a y direction from the starting y coordinate, wherein the x and the y directions are substantially perpendicular to one another.

3. The apparatus of claim 2, wherein the number of pixels in the x direction and in the y direction includes 1 pixel by 1 pixel, respectively, to provide a high level of fineness in approximating the arbitrary shape object using the plurality of rectangular blocks.

4. The apparatus of claim 1, wherein the plurality of rectangular blocks for the first plane is variable and is dependent on the shape of the arbitrary shape object and the desired fineness or coarseness of the arbitrary shape object formed using the plurality of rectangular blocks.

5. The apparatus of claim 1, wherein the arbitrary shape comprises at least one of a circle, ellipse, oval, triangle, tetragon, pentagon, hexagon, heptagon, octagon, nonagon, or decagon.

6. The apparatus of claim 1, wherein the arbitrary shape is non-rectangular.

7. The apparatus of claim 1, further comprising:
   a controller operatively coupled with the table and the at least one overlay engine to provide the information about the respective positions and the sizes of the plurality of rectangular blocks to the at least one overlay engine.

8. The apparatus of claim 7, wherein the controller is configured to
   receive requests from the at least one overlay engine for information about the respective positions and the sizes of the plurality of rectangular blocks,
   arbitrate among requests for information about the respective positions and the sizes of the plurality of rectangular blocks from the at least one overlay engine and other overlay engines, and
   allocate the information about the respective positions and the sizes of the plurality of rectangular blocks to the at least one overlay engine.

9. The apparatus of claim 7, wherein the controller is configured to allocate the information about the respective positions and the sizes of the plurality of rectangular blocks to the at least one overlay engine according to a First In, First Out (FIFO) scheme.

10. The apparatus of claim 7, wherein the at least one overlay engine is configured to provide an offset address and the plurality of rectangular blocks to the controller in a request for information about the respective positions and the sizes of the plurality of rectangular blocks, wherein the offset address indicates the offset address in memory of the table comprising the information about the respective positions and the sizes of the rectangular blocks and, wherein the plurality of rectangular blocks indicates how many rectangular blocks are allocated starting from the offset address.

11. The apparatus of claim 1, wherein the table comprises information about the respective positions and the sizes of the plurality of rectangular blocks for multiple planes having one or more arbitrary shape objects; and
   multiple overlay engines operatively coupled with the table and respectively associated with the multiple planes to request the information about the respective positions and the sizes of the plurality of rectangular blocks to provide overlay of the arbitrary shape object.

12. The apparatus of claim 1, further comprising:
   a processor coupled with the at least one overlay engine.

13. The apparatus of claim 1, wherein the generated data comprises one of random data, pseudo-random data, meaningless data, or data having all zeros.

14. A method comprising:
   storing a table comprising information about respective positions and sizes of a plurality of rectangular blocks, wherein the plurality of rectangular blocks substantially forms an arbitrary shape object of a first plane;

requesting the information about the respective positions and the sizes of the plurality of rectangular blocks to provide graphics overlay of the arbitrary shape object, wherein the plurality of rectangular blocks forming the arbitrary shape object of the first plane define hidden regions in a second plane that underlies the first plane, wherein the second plane includes (i) the hidden regions and (ii) non-hidden regions that are not to be hidden by the arbitrary shape object of the first plane while the second plane is being displayed;

storing, in a storage medium, data associated with pixels of the second plane;

receiving a request to transfer data associated with pixels of a first region of the second plane from the storage medium to a display buffer;

determining whether the first region of the second plane is (i) within the hidden regions or (ii) within the non-hidden regions;

in response to determining that the first region of the second plane is within the hidden regions, refraining from accessing the storage medium to retrieve data associated with pixels of the first region of the second plane;

in response to (i) receiving the request to transfer data associated with pixels of the first region of the second plane from the second storage medium and (ii) determining that the first region of the second plane is within the hidden regions, generating data corresponding to the first region of the second plane, wherein the storage medium is not accessed to generate the data, and wherein the generated data corresponding to the first region of the second plane is different from data that are (i) stored in the second storage medium and (ii) associated with pixels of the first region of the second plane, and transferring the generated data to the display buffer; and displaying, on a display,
(i) the first plane having the arbitrary shape object formed from the plurality of rectangular blocks, and
(ii) the second plane excluding the hidden regions, wherein the first plane graphically overlays the second plane.

15. The method of claim 14, wherein:
the information about the respective positions comprises a starting x coordinate and a starting y coordinate; and
the information about the respective sizes comprises a number of pixels in an x direction from the starting x coordinate and a number of pixels in a y direction from the starting y coordinate, wherein the x and the y directions are substantially perpendicular to one another.

16. The method of claim 15, wherein the number of pixels in the x direction and in the y direction includes 1 pixel by 1 pixel, respectively, to provide a high level of fineness in approximating the arbitrary shape object using the plurality of rectangular blocks.

17. The method of claim 14, wherein the plurality of rectangular blocks for the first plane is variable and is dependent on the shape of the arbitrary shape object and the desired fineness or coarseness of the arbitrary shape object formed using the plurality of rectangular blocks.

18. The method of claim 14, further comprising:
receiving requests from a first overlay engine for information about the respective positions and the sizes of the plurality of rectangular blocks;
arbitrating among the requests for information about the respective positions and the sizes of the plurality of rectangular blocks from the first overlay engine and a second overlay engines; and
based on arbitrating among the requests for information, allocating the information about the respective positions and the sizes of the plurality of rectangular blocks to the first overlay engine.

19. The method of claim 18, wherein allocating the information further comprises allocating the information to the first overlay engine according to a First In, First Out (FIFO) scheme.

20. The method of claim 14, wherein the table comprises information about the respective positions and the sizes of the plurality of rectangular blocks for multiple planes having one or more arbitrary shape objects.

* * * * *